United States Patent [19]
Kuckes

[11] Patent Number: 5,923,170
[45] Date of Patent: Jul. 13, 1999

[54] METHOD FOR NEAR FIELD ELECTROMAGNETIC PROXIMITY DETERMINATION FOR GUIDANCE OF A BOREHOLE DRILL

[75] Inventor: Arthur F. Kuckes, Ithaca, N.Y.

[73] Assignee: Vector Magnetics, Inc., Ithaca, N.Y.

[21] Appl. No.: 09/047,926

[22] Filed: Mar. 26, 1998

Related U.S. Application Data

[60] Provisional application No. 60/042,669, Apr. 4, 1997.

[51] Int. Cl.$^6$ .............................. E21B 7/04; E21B 47/022; G01V 3/08; G01V 3/38
[52] U.S. Cl. ........................... 324/326; 175/45; 175/62; 324/207.17; 324/346
[58] Field of Search ..................................... 324/247, 326, 324/329, 334, 336, 343, 345, 346, 207.17, 207.26; 175/40, 45, 61, 62; 342/459; 702/150

[56] References Cited

U.S. PATENT DOCUMENTS

| | | | |
|---|---|---|---|
| 4,110,679 | 8/1978 | Payne | 324/329 |
| 5,343,152 | 8/1994 | Kuckes | 324/346 |
| 5,485,089 | 1/1996 | Kuckes | 324/346 |
| 5,537,041 | 7/1996 | Candy | 324/329 |

*Primary Examiner*—Gerard Strecker
*Attorney, Agent, or Firm*—Jones, Tullar & Cooper PC

[57] ABSTRACT

A method and apparatus for precise measurement of the distance and direction from a magnetic field sensor to a nearby magnetic field source includes an elongated iron core solenoid driven by a repetitive, nonsinusoidal current source. In the near field the solenoid has two spaced, temporally varying magnetic poles, and measurement of the distance and direction to this source includes analysis of field components which vary in synchronism with the current source.

21 Claims, 6 Drawing Sheets

METHOD FOR NEAR FIELD ELECTROMAGNETIC PROXIMITY DETERMINATION FOR GUIDANCE OF A BOREHOLE DRILL

BACKGROUND OF THE INVENTION

This application claims the benefit of U.S. Provisional application Ser. No. 60/042,669 filed Apr. 4, 1997. The disclosure of which is hereby incorporated herein by reference.

The present invention relates, in general, to a method and apparatus for drilling parallel wells, and more particularly to guiding a well being drilled along a path parallel to an existing, closely-spaced horizontal well.

The difficulties encountered in guiding the drilling of a borehole to intersect, to avoid, or to follow the path of an existing well at distances of thousands of feet below the surface of the earth are well known. Precise guidance is required for controlling the direction of drilling a borehole when it is desired to avoid existing wells in a field or when it is desired to locate and intersect an existing oil or gas well which has blown out. Various electromagnetic methods for controlling such boreholes have been developed and have met with significant success. However, special problems can occur where existing techniques are not sufficient to provide the degree of control required for particular applications.

Difficulty occurs, for example, in the drilling of multiple horizontal wells, particularly where a borehole being drilled must be essentially parallel to, and very close to, an existing well. The need to provide two or more horizontal wells in close proximity, but with a controlled separation, occurs in a number of contexts such as in steam assisted recovery projects in the petroleum industry, where steam is to be injected in one horizontal well and mobilized viscous oil is to be recovered from the other. Such steam assisted gravity drainage wells are used to recover heavy oil from tar sands and, although such oil is more expensive to produce and is of lower value than crude oil, it is still economically valuable due to improved production techniques. These wells are generally drilled at depths of from 500 to 1500 meters with a horizontal extension of one kilometer or more, with the first well being drilled and cased in conventional manner through the tar sands, and the second well being drilled vertically above the first, at a distance of 5 meters, plus or minus 1 meter.

A method for measuring the distance and direction from a borehole being drilled to an existing well utilizing a solenoid magnetic field source in the existing well and a standard down hole measurement while drilling (MWD) electronic survey instrument in the borehole being drilled is described in U.S. Pat. No. 5,485,089. That patent mathematically characterizes the solenoid field source as a magnetic dipole which is energized by a reversible direct current source. A conventional MWD tool then guides the drilling of a borehole on a precisely controlled path relative to the source. The method of that patent requires that the times at which the source is turned on and off and polarity reversed be synchronized with the times of downhole measurement, which can be operationally inconvenient.

Other techniques for guiding the drilling of a parallel borehole are also described in the prior art. In one alternating current system, multiple receiver and transmitter locations are disclosed, with a sinusoidally varying magnetic field signal being produced by the transmitter (see U.S. Pat. No. 4,710,708 to Rorden et al.). The sinusoidal vector components of the varying magnetic field are characterized and analyzed by amplitude and phase parameters in the spirit of sinusoidal signal analysis. This method is not capable of taking into account important aspects of a non-linear ferromagnetic solenoid deployed in a borehole.

Another technique for guiding the drilling of parallel wells utilizes multiple static magnetic poles which are produced by magnetized casing sections. However, this technique requires the premagnetization of the casing in the first, or reference well, and renders the earth's magnetic field unusable for compass purposes.

Still another electromagnetic guidance method utilizes a loop of wire on the earth's surface for receiving signals from a source in the existing well (see, for example, U.S. Pat. No. 4,072,200 to Morris et al.). The source is characterized by straight line, current-carrying wire segments, rather than by a dipole, and operates through the use of a reversible constant current supply, rather than alternating current.

There are advantages to the use of a continuous alternating current system instead of the direct current systems generally in use, for a continuous AC facilitates signal processing and reduces the complexity of the apparatus. Further, the use of an elongated iron core solenoid as a magnetic field source also has advantages, since by making the source relatively long, and driving the core of the solenoid to saturation, the strength of the magnetic field can be maximized. To achieve the source strength required for borehole deployment, ferromagnetic cores are a necessity. However, presently available systems have not been capable of effectively using these features in "near field" measurements within several solenoid lengths from the source because of the nonlinearites of such solenoids and because of the complexities introduced by their two spaced poles.

Given the advanced state of electrical circuit theory, it would be natural to assume that the time variations of a magnetic field source could be described and evaluated using the complex impedance principles developed for describing the time varying behavior of electrical circuits. In a purely resistive circuit, the ratio of source voltage or current at a specified point in the circuit is a single, signed number for any time variation. Although the source strength and current at a specified point in a circuit having induction and capacitance do not vary in synchronism with one another, nevertheless the essence of AC circuit theory is the ability to describe the temporal behavior of a circuit with inductance and capacitance by decomposing source strength, voltages, and currents into a sum of sinusoidal parts, each of which has a characteristic amplitude and phase. Prior art techniques such as are described in U.S. Pat. No. 4,710,708 to Rorden et al. are based upon such measurements and calculations.

However, even without saturation, iron behaves magnetically in a nonlinear way, and driving it into saturation makes it even more difficult to produce from an iron core solenoid a magnetic field which will vary sinusoidally with a sinusoidal drive current. This nonlinear behavior of iron has several important effects which rule against sinusoidal excitation and/or simply selecting Fourier components of a magnetic field which vary sinusoidally in time. The nonlinear behavior of iron is such that the fields generated by the solenoid have a complex source characterization in addition to temporal behavior which is different from the current exciting the solenoid. As a result, the use of standard Fourier analysis techniques, with amplitude and phase measurements to characterize the observed time-varying fields, and mathematically modeling these results to determine source location, can lead to serious discrepancies due to subtle errors.

Furthermore, since the saturation of an elongated core starts at the center portion of the core and moves along its length toward the ends during each cycle of excitation, not only are the poles of an iron core solenoid spaced apart, but the locations of the magnetic field poles shift along the length of the core during each cycle of the drive current. It is critical for precise distance and direction measurements to be able to characterize such a source in a mathematically simple way; e.g. either as being a dipole, or as consisting of time varying magnetic poles which are located temporally a constant distance apart. However, because of the variability which exists in the permeability of iron, there are simultaneous changes in both pole strength and pole separation in an iron core as the excitation current goes from positive to negative values. As a result, the magnetic field source cannot be considered a simple dipole or as a simple pair of poles a fixed distance apart, and precise mathematical modeling of a solenoid source becomes extremely difficult. Simply determining the phase and amplitude of a sinusoidal component of the fields generated does not permit complete compensation for the non-linear behavior. Furthermore, if the time variation of the source is rapid enough, induced currents in the earth, in the source, and in the casing in which the source is deployed, become significant factors. In addition ferromagnetic hysteresis effects can further complicate the analysis of the field.

SUMMARY OF THE INVENTION

It is, therefore, an object of the present invention to provide an apparatus and method for the precise measurement of the distance and direction from a magnetic field sensor to a nearby source for the purpose of precisely guiding the direction of drilling of a borehole with respect to a nearby target.

Briefly, the present invention is directed to a guidance system which utilizes an AC magnetic field source having an elongated iron core solenoid located at a target location and driven by a repetitive, nonsinusoidal current source to produce two spaced, temporally varying magnetic poles. The system utilizes the measurement and analysis of magnetic field components which vary in synchronism with the source to determine distance and direction from a field sensor to the source. These measurements are made by fluxgate magnetometers in an MWD tool, or probe, in a borehole being guided, the measurements are analyzed downhole, and the results are transmitted uphole for use in controlling the direction of drilling of the borehole with respect to the target.

The magnetic field source preferably is located in a nearby existing well, which may be referred to as a target well, while the MWD tool is located in a borehole which is to be drilled along a path close to, and along, the target well. The source is an elongated iron core solenoid preferably having a length of about 5 meters, a diameter of about 1½ inches, and being wound from end to end with about 6000 turns of No. 22 wire. The resulting coil is energized by an alternating current of, for example, 1.5 amps to drive the iron to saturation first in one direction and then in the opposite direction during each cycle of the AC source to thereby maximize the magnetic field strength in each direction.

In a preferred application of the method of the present invention, a borehole is to be drilled to be parallel to an existing target well at a distance which is approximately equal to or less than the length of the solenoid; that is, at a distance of about 5 meters from the existing well. However, at this distance, the solenoid cannot be accurately represented mathematically as a time varying dipole because of relative movement of the pole locations along the length of the solenoid as the core saturates. Accordingly, simple dipole moments cannot be used for accurate determination of the location of the field source from the MWD tool. Instead, the field source is represented, in accordance with the present invention, as a pair of time-varying magnetic poles with variable strengths and locations to thereby provide the precision of measurement that is required.

More particularly, the elongated magnetic field source provided by the solenoid of the present invention consists of two magnetic poles, which may be identified as +Q and −Q, separated by a distance 2 l. The dipole moment m of the solenoid is equal to the product of the separation between the poles and the pole strength; that is, m=2 lQ. At distances much greater than 2 l, the magnetic field source may be characterized by the moment m, and thus the field source may be treated mathematically as a dipole for calculations of distance and direction from the sensor, as has previously been done. However, in the present case, where the separation between the sensor (or receiver) in the MWD tool and the solenoid magnetic field source (or transmitter) in the target well may be comparable to the length of the solenoid, the magnetic field source is more accurately defined in terms of two poles and their distance of separation, instead of referring to a single dipole. To facilitate the analysis of the magnetic field on the basis of two spaced poles, the time variation of the magnetic field is chosen to be sufficiently slow that the field at any point in space can vary temporally in synchronism with its drive current source. In addition, if the variation of the electrical drive source produces a magnetic field which can be characterized by fixed pole locations and by time variations of pole strengths, then that source will generate a corresponding magnetic field which varies in synchronism with it. Under these conditions, the signed ratio (F/S) of any magnetic field component F, measured at an observation point, to the strength S of the source is invariant with time. Establishing this signed ratio from the total signal is done, in accordance with the invention, in a direct, optimum way which has better noise rejection than is available, for example, through Fourier analysis on a sinusoidal part of the signal. As noted above, because of the non-linear nature of an iron core solenoid, even if the excitation current is sinusoidal, the resulting magnetic field will not be sinusoidal. Furthermore, because the variation of the permeability of the iron core effectively changes the location of the poles during each cycle of the driving current, the resulting simultaneous changes in both pole strength and location produce a highly complex nonlinear temporal behavior in the magnetic field. The mathematical characterization and analysis of such a field is virtually impossible at distances comparable to the pole separation; i.e., in the "near field" of the magnetic field source.

The problems in near-field measurements caused by sinusoidal drive currents for iron core solenoids are overcome, in accordance with the invention, by providing a drive current source which varies repetitively, but non-sinusoidally, to produce in an elongated solenoid a magnetic field which varies in synchronization with the current source but which is not proportional to the current flow. The strength of the magnetic poles will be known because the drive current, the solenoid characteristics, and the effect of any casing in which the solenoid is located in the target well are known through calibration procedures. By operating at a slow rate of time variation during measurement periods, no eddy currents are produced in the earth surrounding the solenoid or in any casing in the target well or in the solenoid itself, so the effects of the medium in which the field source is located are negligible. By eliminating measurements during times of field reversal the ferromagnetic hysteresis and eddy current effects are eliminated.

The time variation of the magnetic field which is to be measured at the MWD sensor is in synchronism with its time-varying source S(t) which has a waveform which can be written in terms of a form factor g(t) as S(t)=S*g(t) where S is a constant. The resulting vector components of the magnetic field F(t) are also time varying in synchronism with the source, and even if there is random noise superimposed on that field, the measured field will still incorporate a part which is coherent with the form factor g(t) of the source.

In accordance with the method of the present invention, three vector components of the time varying magnetic field F(t) are sampled periodically by a field sensor such as a magnetometer of the type described in the aforesaid U.S. Pat. No. 5,485,089 to obtain an ensemble, or set, of instantaneous field vector values along three orthogonal axes. At the same time, a series, or set, of instantaneous measurements of the drive current source are obtained and, since the current source and the field are usually in synchronism, these two sets of instantaneous values are also synchronized. However, there will often be a significant time shift between the clock controlling the generation of the field and the clock controlling the measurements of the field, so there must be compensation for this time shift.

The measured magnetic field is generally correlated with, but is not proportional to, the amplitude of the current source driving the solenoid. In reality, because of the nonlinearity of an iron core solenoid, the separation 2 l is also modulated as the iron core approaches saturation, and during this time the relationship between the magnetic field and the current source is complicated, causing serious complexities in any calculations involving field measurements. In accordance with the present invention, however, this lack of proportionality in the data obtained during source polarity reversals is overcome by excluding from any calculations the measurements made during the period of polarity reversal, while the poles are moving as the iron core approaches saturation. This eliminates measurements made during the time when the field is behaving in a complicated way and permits consideration of signals measured only when the effective pole locations are fixed and thus when the separation is fixed.

Although there may be a lack of strict proportionality between the current source and the magnetic field, as discussed above, the field normally remains essentially symmetrical with respect to the direction of the current flow. Strict synchronism between the source current and the field is prevented by hysteresis in the iron core of the solenoid, which effectively causes an apparent time shift between the current source clock and the measurement clock in addition to any intrinsic shift between the clocks. In accordance with the invention, time synchronization is obtained by adding to the measurement clock a time shift to bring the measured signal source strength form factor g(t) into synchronism with the downhole measurement form factor g(t+ts) where ts is a time shift which must be determined. This is done by varying an assumed value for ts in calculations using the measured field to maximize the correlation between the known shape of g and the measurements. The value of ts is then used in separate calculations to provide accurate evaluation of the measurements.

As a result of the exclusion of certain measurements and the procedure to obtain and maintain time synchronization, accurate calculations of the distance and direction from the sensor to the field source can be made on the basis of the measured magnetic fields, and these calculations are then used to guide the drilling of the borehole. It has been found that the system of the invention is sufficiently accurate to permit a drill to be guided with an accuracy of ±4 cm at a nominal distance of 5 m from the target. Such accuracy is extremely important in guiding the drilling of the borehole, for typically these measurements are made only after drilling about 10 meters, during which time directional errors are magnified.

In summary, then, to determine the distance and direction from an MWD tool in a borehole to a target well, an elongated iron core solenoid of about 5 meters in length is positioned in the target well at the same depth as the MWD tool. The solenoid is driven to saturation by a slowly varying alternating current source at the surface which is connected to the solenoid by a wireline. The AC source may have a complex temporal waveform, but the waveform of the magnetic source is preferably close to a square wave. The solenoid produces a corresponding magnetic field in the earth surrounding the target well, and this field is detected by a magnetometer carried by the MWD tool in the nearby borehole. The borehole is separated from the existing well by a distance on the order of the length of the solenoid and the measured magnetic field is used to calculate the distance and direction between the borehole and the target well for use in guiding the direction of drilling of the borehole.

The solenoid, when energized by the alternating current source, has two separate magnetic poles which vary in strength and location along the solenoid as the drive current varies over each cycle. By using a slow rate of repetition for the source, the effect of hysteresis in the iron of the solenoid and casing in which it may be deployed is reduced. As a result, the field detected by the magnetometer is coherent with and is synchronized with the drive source when corrected for the effects of nonlinearites in the solenoid, as discussed above. To measure this field, multiple instantaneous measurements are made by the magnetometer of orthogonal field vector components, to produce an ensemble of measurements. The magnetic field strength and direction are calculated by excluding data obtained during polarity reversals of the current source so that the only field data used are obtained while the two magnetic field poles are fixed at the opposite ends of the solenoid and eddy currents have decayed. In addition, the field measurements are adjusted for time shifts to produce essential synchronization of the measured field with the drive current source.

After calculation of the resultant magnetic fields, the calculated values are transmitted to the surface of the earth, where further calculations are made to determine the distance and direction from the sensor to the source and to provide guidance data for further drilling.

BRIEF DESCRIPTION OF THE DRAWINGS

The foregoing, and additional objects, features and advantages of the present invention will become apparent to those of skill in the art from the following detailed description of a preferred embodiment thereof, taken in conjunction with the accompanying drawings, in which.

DESCRIPTION OF PREFERRED EMBODIMENTS

Figure 1:
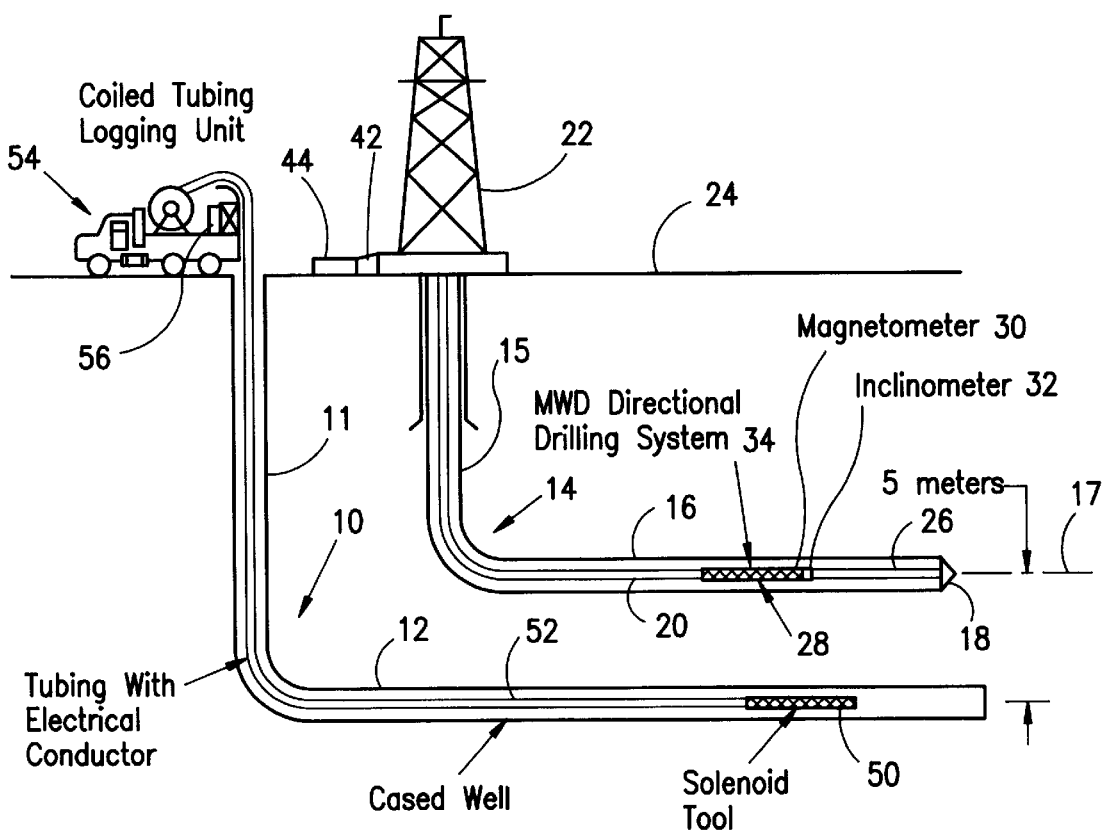
FIG. 1 is a diagrammatic view of a target well and a borehole being drilled close to, and parallel to, the target utilizing the proximity detection system of the present invention.

Turning now to a more detailed consideration of the present invention, there is illustrated in FIG. 1 apparatus for guiding the direction of drilling of a borehole with respect to an existing well. The existing well, indicated at 10, may be a production well extending vertically downwardly, as illustrated at 11, for a distance of, for example, 1500 meters and then curving to extend horizontally, as at 12. In one application of the invention, the well 10 may extend through tar sands or the like for the production of petroleum. The well may be cased, and may extend horizontally for a distance of a 1000 meters or more, in a typical installation.

Figure 2:
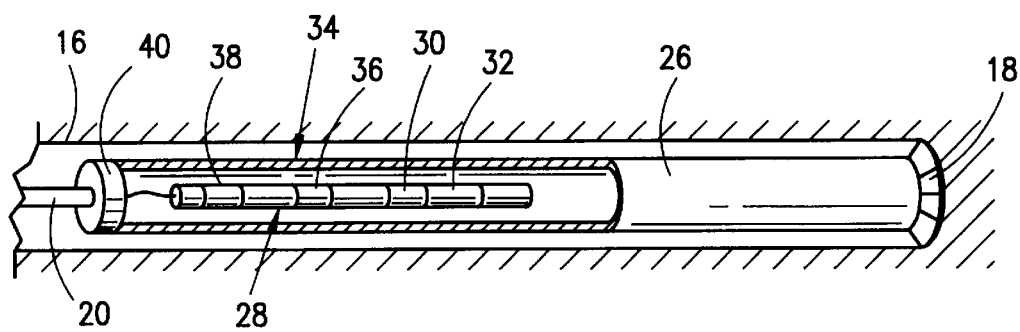
FIG. 2 is a cutaway view of the borehole of FIG. 1 containing an MWD directional drilling system in accordance with the invention.

A second well, or borehole 14, also extends downwardly as at 15, and then curves to extend generally horizontally, as at 16, along a path 17 which is to be vertically above the horizontal section 12 of well 10 and spaced from the existing well by a distance of, for example, 5 meters. A conventional drill head 18 is mounted at the end of a drill string 20 within well 14, the drill string being supported by, and controlled from a suitable drilling rig 22 at the earth's surface 24. As illustrated in FIG. 2, the drill string 20 carries not only the drill head 18 but an orientable drilling motor 26 for driving the drill head and an electronics package 28 which preferably includes a magnetic field sensor such as fluxgate magnetometers 30 for measuring three orthogonal vector components (X, Y and Z) of the magnetic field in which it is located. Package 28 may also include gravity sensors such as inclinometers 32 for measuring three orthogonal vector components (gx, gy and gz) of the earth's gravity, for orientation of the electronics package 28. The drilling head 18, drilling motor 26, and the electronics package 28 make up a measurement while drilling (MWD) unit generally indicated at 34. As illustrated in FIG. 2, the electronics package 28 preferably includes a microprocessor 36 for receiving and processing signals from the sensors 30 and 32. The calculations carried out by that microprocessor result in output signals which represent the vector component values of the magnetic field at the sensor, and these signals are transferred from the microprocessor 36 to a conventional transmitter 38. Transmitter 38 transfers these output signals to the surface, utilizing, in a preferred form of the invention, a conventional drilling fluid pressure pulse generator 40. The pressure pulses so generated are detected at the surface 24 by a pulse sensor 42 which converts the pulses into electrical signals which are then supplied to a computer 44 for use in calculating control signals for guiding further drilling of borehole 14.

The magnetic field vector calculations made by processor 36 are based on measurements by the magnetometer 30 of an alternating magnetic field produced by a solenoid 50 located in the existing well 10 and positioned at approximately the same depth as the MWD drilling system 34. The solenoid 50 is supported in the well 10 by a wireline 52 which may be in the form of flexible tubing containing a suitable electrical conductor for supplying power to the solenoid, for example from a power source at the surface 24. The wireline 52 may be supplied to the well 10 by a conventional well logging unit 54, with electrical current being supplied to the solenoid by way of the electrical conductor within the tubing from an alternating current power source 56. The source 56 produces a low frequency alternating current waveform of arbitrary shape to supply a current of, for example, about 1.5 amperes to the solenoid 50.

Figure 3:
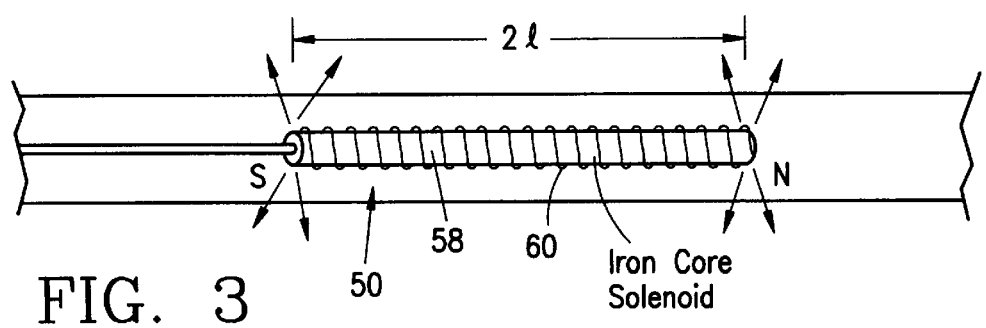
FIG. 3 is a cutaway view of the target well of FIG. 1 containing an iron core solenoid in accordance with the invention.
Figure 4:
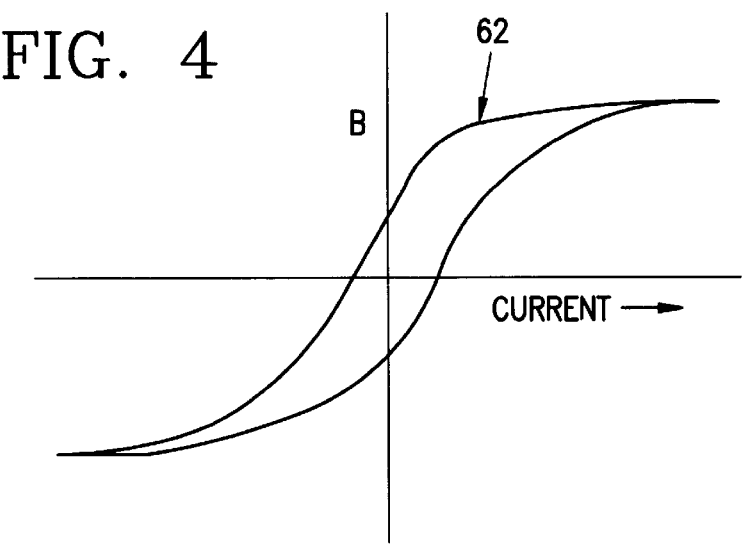
FIG. 4 is a hysteresis curve for the solenoid core.

The solenoid 50 includes an iron core 58, as illustrated in FIG. 3, which carries a suitable winding 60. In a preferred form of the invention, the iron core is 5 meters in length with a diameter of 1¼", while the winding is a coil consisting of 6,000 turns of No. 22 wire. This winding enables the current supplied from source 56 to drive the core 58 into saturation in alternating positive and negative directions, in the manner illustrated in FIG. 4 by the hysteresis curve 62 for the iron core.

Figure 5:
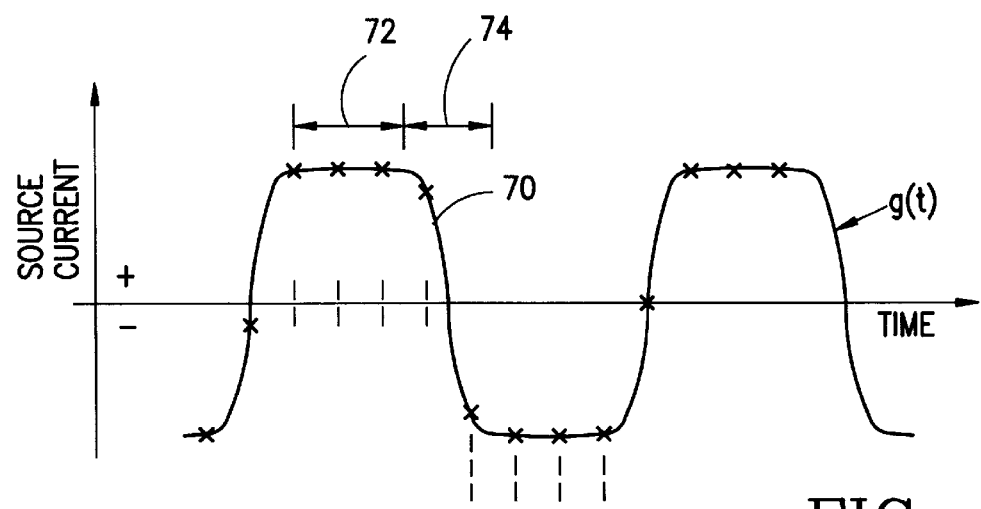
FIG. 5 illustrates the waveform of a typical alternating current supplied to the solenoid of FIG. 1.

Source 56 produces an alternating current having an amplitude of arbitrary shape g(t) illustrated by the waveform 70 in FIG. 5. This waveform is repetitive and has a low frequency, on the order of a few Hertz or less, and preferably is close to the shape of a square wave so as to have a crest time 72, when the current does not change substantially, greater than a transition time 74, when the alternating current goes from a positive direction to a negative direction, or vice versa. The current represented by waveform 70 drives the solenoid into saturation, first in the positive direction and then in the negative direction, to cause the solenoid to produce a corresponding positive and then negative alternating magnetic field having an amplitude represented by waveform 76 in FIG. 6.

By driving the core 58 to saturation with a current having a relatively long crest period 72, a maximum magnetic field strength is obtained from the solenoid, with the magnetic field being concentrated at the two ends of the core, to form spaced north and south poles. The magnetic field remains relatively stable during the period indicated at 78 on waveform 76, when the iron core is saturated. However, during the transition period 80, when the iron core moves from positive saturation to negative saturation, the magnetic flux in the core changes and causes the locations of the north and south poles to reverse as the core moves out of saturation in one direction and moves into saturation in the reverse direction.

Figure 7:
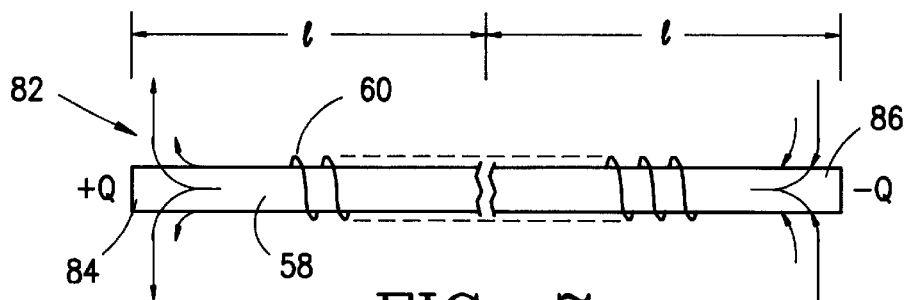
FIG. 7 is a diagrammatic illustration of the magnetic field produced by the solenoid of FIG. 1, with a fully saturated core.

As illustrated in FIG. 7, a strong AC excitation current in winding 60 in a first direction causes the core 58 to be driven into saturation in a corresponding direction, causing the magnetic flux lines 82 leaving the core to be concentrated at the opposite ends 84 and 86 of the core as discussed by Jones, Hoehn, and Kuckes, "Improved Magnetic Model for Determination of Range and Direction to a Blowout Well", SPE Drilling Engineering, December 1987. This gives an effective spacing of 2 1 between the north and south magnetic poles, which may be identified as +Q and −Q.

Figure 8:
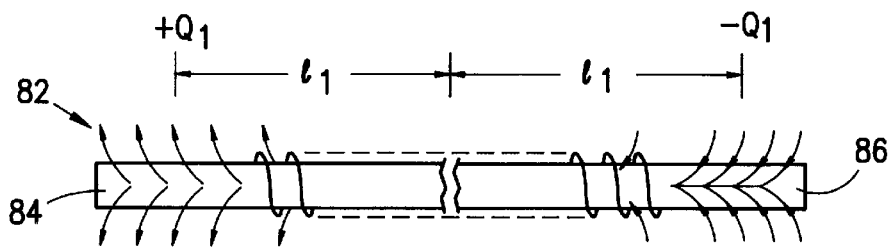
FIG. 8 is a diagrammatic illustration of the magnetic field produced by the solenoid before complete saturation.

Under a weak excitation current, which occurs during reversal of the AC source during the transition time 74 (FIG. 5), the core moves out of saturation and the flux lines 82 are spread out, as illustrated in FIG. 8, causing the effective locations of the opposite poles +Q and −Q to begin to move inwardly from the ends 84 and 86. The poles move closer together as the current weakens during the transition time 74, with the poles moving toward the center of the iron core at the lowest current level and then moving out to opposite ends during the next half-cycle of the source current, until the poles are reversed at the opposite ends of the core. As a result, the locations of each of the poles +Q and −Q move from one end of the core inwardly toward the center, reverse, and move outwardly to the opposite end during each half cycle of the alternating current source. This change in the location of the poles creates significant uncertainty in the magnetic field near the elongated solenoid, making it very difficult to determine precisely the location of the magnetic field source from a field sensor such as the magnetometer 30 when it is relatively near the field source; i.e., when the sensor is within a distance which is equal to a few lengths of the solenoid or less.

For example, a sensor such as the fluxgate magnetometer 30 measures the vector components Bx, By and Bz of a magnetic field in conventional manner. At distances of about 15 meters or more from a solenoid source which is 5 meters in length, calculations of the distance and direction of the solenoid source from the sensor can be carried out by assuming that the source is a magnetic dipole as explained in U.S. Pat. No. 5,485,089, and such measurements are sufficiently accurate to permit guidance of the drill string at that distance. However, when the field sensor in the borehole approaches to a distance of about 5 meters from the field source (with a solenoid that is about 5 meters in length), near field effects are dominant, and the source can no longer be treated as a dipole. For accurate location of the source from this distance, the separation of the poles must be taken into account by treating the solenoid as two separated magnetic field poles. When these poles are moving during the transition period from saturation in one direction to saturation in the other direction, the calculations necessary for accuracy in determining the distance and direction from the sensor on the basis of vector measurements become extremely complex.

When measuring a magnetic field from a sensor at a nearby observation point, the field strength F varies in synchronization with the waveform of the source strength, i.e., F~g(t), and the amplitude of the field is directly related to the distance between the source and the sensor. However, distortions due to hysteresis in the iron core of the solenoid, eddy currents and noise produced by stray sources of magnetic field cause errors in the measurement at the sensor magnetometer. These errors must also be corrected in order to obtain the accuracy required to guide the drilling of borehole 14 within very close tolerances, making the already complex calculations even more difficult.

In accordance with the present invention, the near-field measurement of magnetic field strength for determining field source location is carried out by obtaining an ensemble, or set, of measurements, by averaging those measurements over time to eliminate noise, by excluding measurements during the transition periods of solenoid core saturation, and by shifting the time of the measured field to correct for hysteresis effects and clock mismatch and drift. These adjustments bring the measured field strength waveform into synchronization with the waveform of the alternating current source and enhance the determination of distance between the field source and the sensor. This correction also ensures that the magnetic field vectors Bx, By and Bz are accurate so that accurate calculations of the distance and direction of the source from the sensor can be made to enable the drill to be properly guided. The corrections for these factors are carried out in part in the microprocessor 36 in the electronics package 28 and in part in the computer 44 at the surface.

Figure 6:
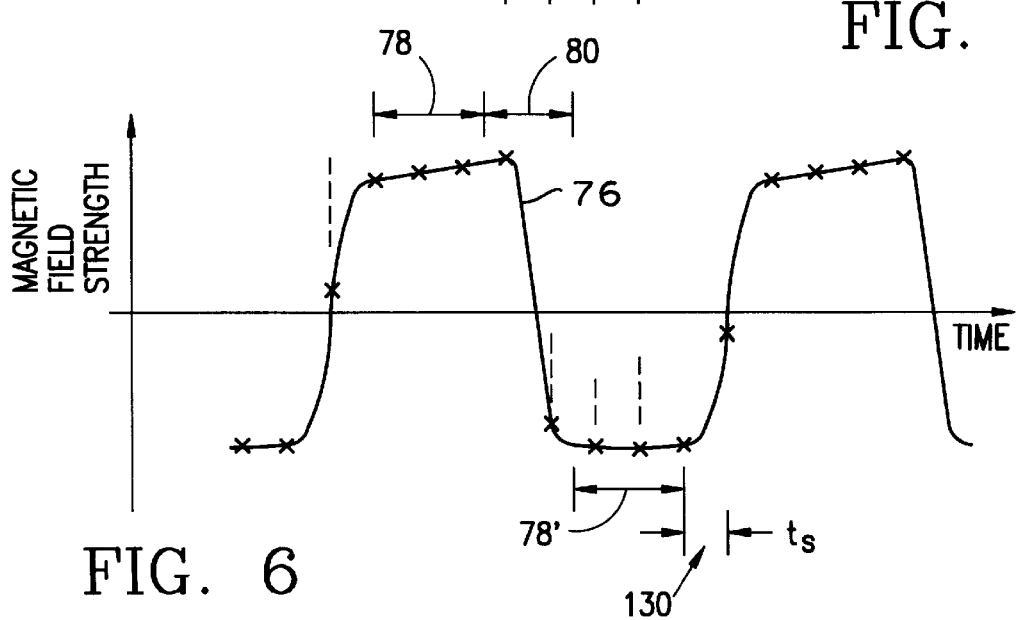
FIG. 6 illustrates the waveform of a magnetic field produced by the solenoid, as measured at the MWD directional drilling system.
Figure 9:
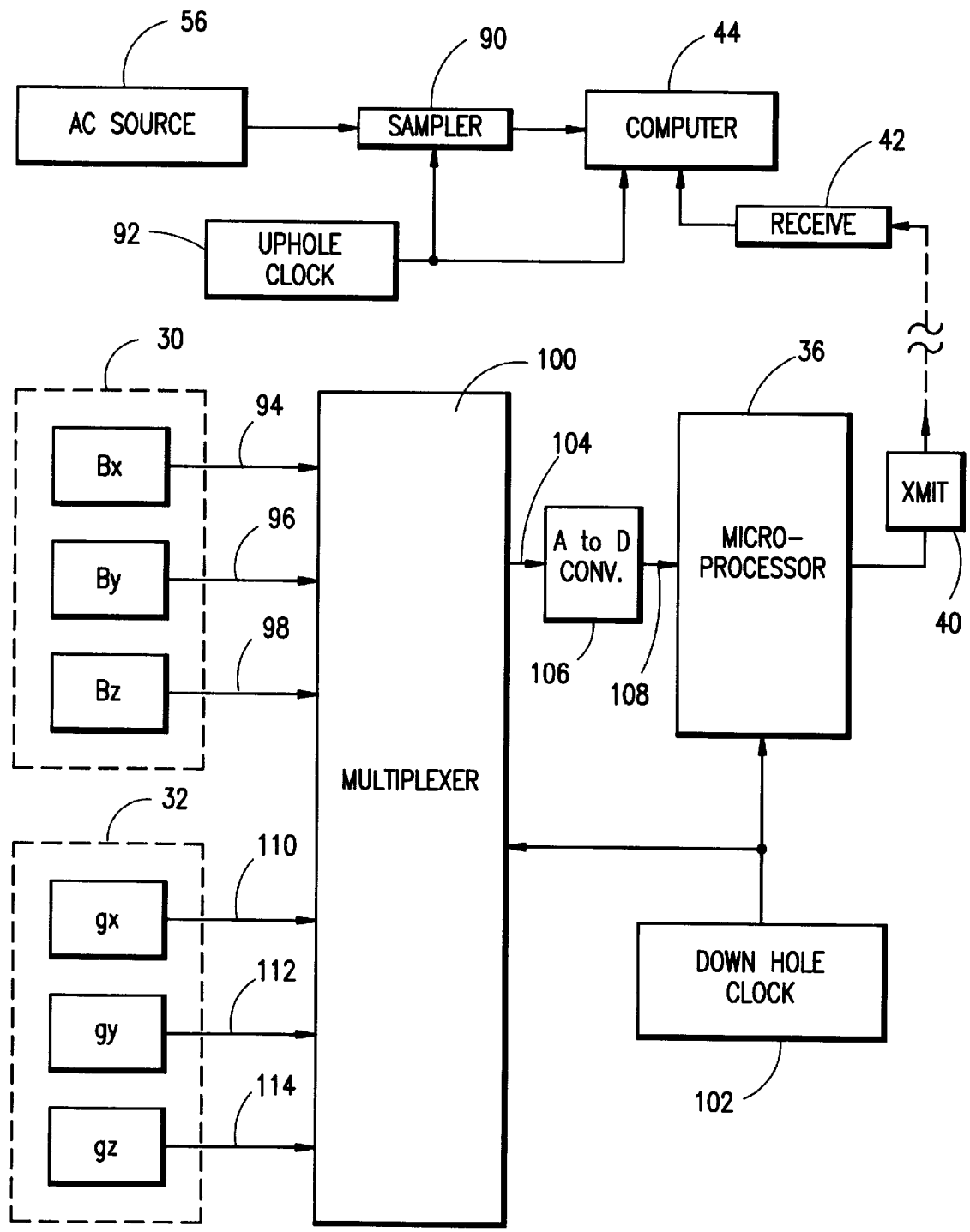
FIG. 9 is a diagrammatic illustration of a sampling circuit and microprocessor for use in the present invention.

The ensemble of measurements is obtained in the manner illustrated in FIGS. 5, 6 and 9, to which reference is now made. The current waveform 70 produced at the surface by AC source 56 for driving the solenoid is periodically sampled at spaced intervals of time, as indicated by the "X" marks along the wave form 70, by a sampler circuit 90 driven by an uphole (surface) clock 92 (FIG. 9). The instantaneous values of the corresponding source strength waveform characterizing the solenoid are given by:

$$S'(t)S\ g(t) \tag{Eq.1}$$

where S' (t) is the instantaneous value of the appropriate source parameter; e.g. the pole strength Q or the dipole moment, S is a constant representing the maximum amplitude of the source, and g(t) is the form factor of the wave form 70.

At the same time, as indicated in FIG. 6 by the "X" markings along waveform 76, the vector components of the magnetic field strength are sampled at outputs 94, 96 and 98 of the magnetometer 30 to obtain the vectors of instantaneous component field strength values, one of which can be represented by:

$$F'(t)=F\ g(t) \tag{Eq.2}$$

where F' (t) is the instantaneous amplitude of a measured field component, F is a field constant representing the maximum field strength, and g(t) is the same form factor used for the source wave form. The waveform 76 is sampled at the magnetometer outputs by a multiplexer 100 which is driven by a downhole clock 102. The output from the multiplexer is supplied by way of line 104 to an analog to digital converter 106, the output of which is supplied by way of line 108 to microprocessor 36. In addition, the vector outputs of inclinometer 32 are supplied by way of lines 110, 112, and 114 to the multiplexer, and then through A to D converter 106 to the microprocessor.

As further illustrated in FIGS. 5 and 6, the instantaneous measured, or downhole, magnetic field waveform 76, represented by g(ti) may be shifted in time with respect to the surface current source because the uphole clock and downhole clock are not synchronized. To synchronize the clocks, i.e. to find the time difference ts between them, a trial value for ts is added to the apparent instantaneous time values of ti. By trial and error, the value of the time shift ts is adjusted by the microprocessor 36 to maximize the value of the sum of the ensemble of measurements made for the magnetic field strength. This sum may be represented as follows:

$$\text{sum}(Fm(ti)^*g(ti+ts)) \tag{Eq.3}$$

By maximizing this sum, the correct value for ts can be obtained with an ambiguity of a half period of the excitation waveform if it is temporally symmetric with respect to positive and negative current. This ambiguity may ultimately lead to finding a multiplicity of sensor locations consistent with the measurements, but usually this multiplicity is of minor consequence. This ambiguity of whether the downhole clock is synchronized with respect to positive or negative source transitions can be removed by using a temporally asymmetric waveform g as disclosed in U.S. Pat. No. 5,343,152.

By making these corrections, the measured magnetic field waveform 76 is brought into synchronization with the source voltage waveform 70 to give an accurate ratio F/S, and to give accurate values for the vector components Bx, By and Bz obtained by the magnetometer. After obtaining an ensemble of measurements over a period of time for each of the vector components, preferably over a number of cycles of the alternating source, the measured values for each vector are summed in microprocessor 36, with the time values ti adjusted using an updated value for ts, to obtain a weighted average for each vector component of the magnetic field strength Fw, as follows:

$$\text{sum}(g(ti)*Fm(ti))=\text{sum}(F*g(ti))*g(ti))=Fw*\text{sum}(g(ti)*g(ti)) \quad (Eq.4)$$

where Fm represents the measured field strength values of a field component at adjusted times ti which take into account the latest update time shift ts. From the foregoing, a weighted value for each field strength component Fw for each component of the magnetic field is obtained.

$$Fw=\text{sum}(g(ti)*Fm(ti))/\text{sum}(g(ti)*(ti)) \quad (Eq.5)$$

This weighted field value Fw is then transmitted up to the surface computer 44 by way of transmitter 40 and receiver 42 where it is used to obtain a ratio of field strength to source strength to provide the value Fw/S. The differences between measured and calculated values of the magnetic field strength are minimized, with the best result being obtained if the transition time 74 is small compared to the dwell time 72 in the source current waveform.

The value Fw/S would provide an accurate measure of the distance to the solenoid if only the amplitude of the values +Q and −Q varied and not simultaneously their separation. However, when the distance between these poles is modulated by the alternating drive source, then the value Fw/S is no longer valid for near-field measurements and it is necessary to take the next step, which is to exclude data obtained during polarity reversals; i.e., to blank out the readings during the transition time period 74 illustrated in FIG. 5. This is accomplished by setting the value of g(ti) to 0 for each measurement which is taken close to times of source polarity transition. Corresponding adjustments are made to the source strength parameter S used in the computation. This data blanking could also be done in hardware by including a suitable blanking circuit and an amplitude detector connected to respond to the waveform of the measured magnetic field, such as the measured field vector Bz, to produce a blanking signal to disable the signals during the transition periods of the field waveform. The remaining measurements provide instantaneous values of the field during the time period indicated at 72 when the relative location of the poles is substantially fixed.

In order to obtain the maximum number of readings during the time when the poles are in their substantially fixed locations, it is desirable to provide a source waveform 70 which is close to a square wave. This ensures that the transition time is minimized, and that the time period 74 during which the location of the poles is stable is maximized.

The improvement in the value of these vectors provided by the foregoing adjustments to make the magnetic field truly synchronous with the current source permits greatly improved calculations of distance and direction from the magnetometer to the solenoid, and permits accurate control of the drilling of the borehole. It has been found that with the foregoing method, a deviation of plus or minus 4 centimeters can be maintained in the distance between the existing well 10 and the borehole 14.

It should be noted that when the solenoid 50 is in a casing within the well 10, the casing will not only weaken the magnetic field poles Q, but will tend to spread apart the effective locations of the poles, making it even more important to take both the pole strength Q and the separation of the poles into account in the analysis.

Figure 10:
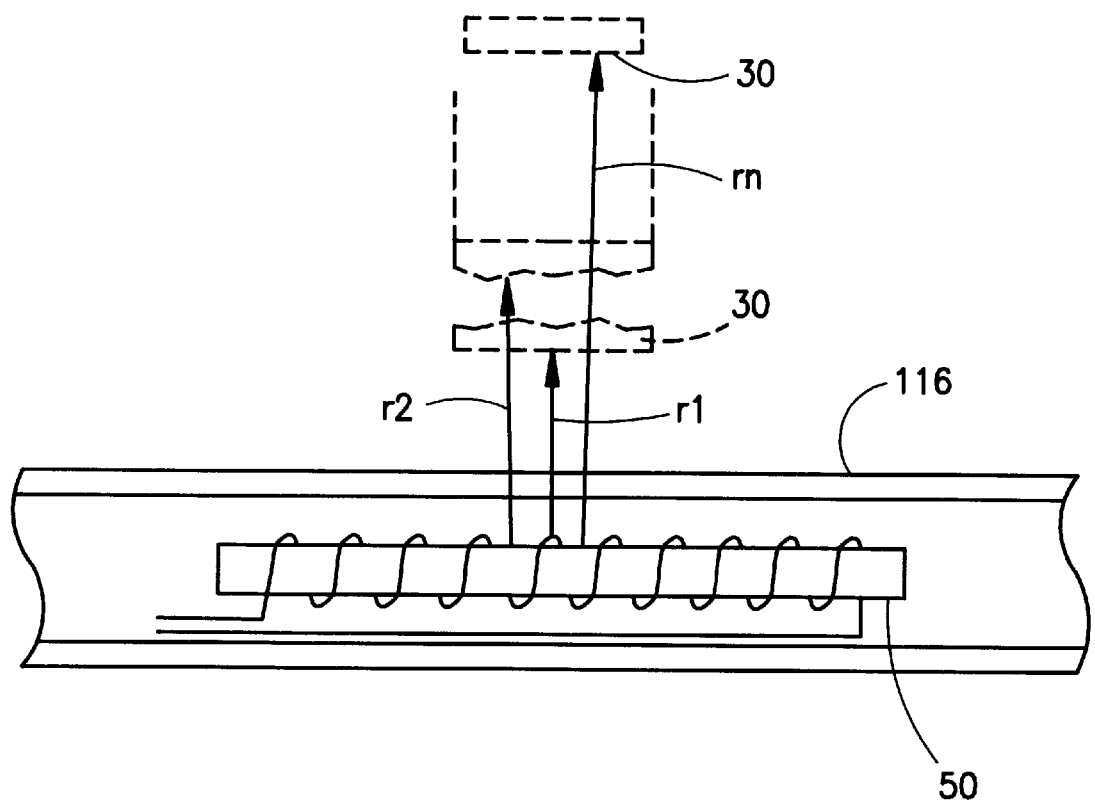
FIG. 10 is a graphical depiction of a set up for surface calibration.

The system of the present invention can be calibrated at the surface by deploying the solenoid 50 in a pipe 116 such as the pipe used in casing a well, as illustrated in FIG. 10, and measuring the field strength at known distances r1, r2, r3 . . . rn to get an ensemble of points. These measurements are made using the same power supply and data processing program and weighing function g that is to be used in actual measurements in the field, with the processing program utilizing the synchronization features of data rejection and time shifting discussed above. Calculations of pole strength Q and separation 21 are made on the basis of the measured data, and optimum values for the pole strength Q and for pole separation to fit the measured data are determined. This can be done using a conventional optimization procedure, such as that described in *Numerical Recipes—The Art Of Scientific Computing* by William H. Press, et al., Cambridge University Press, pages 289–293. Optimum values for Q and pole separation for an entire range of values r under consideration is readily obtained. This calibration characterizes the source for the given operating conditions of the power supply and the casing and sensors, so that when the system is deployed, accurate values for well separation and direction are obtained.

In order to maximize the determination of direction from the sensor equipment to the solenoid, it is usually desirable to position the solenoid so that the magnetometer "sees" the strongest possible radial magnetic field and minimal axial field. Accordingly, it is preferred to position one end of the solenoid 50 in approximate lateral alignment with the magnetometer 30. This is accomplished by controlling the depth to which the solenoid is deployed in the existing well 10. This depth can be precisely determined from previous measurements.

The foregoing description is supported by the following theory concerning the generation of magnetic fields from magnetic poles. For every positive magnetic pole +Q, a conjugate negative pole −Q is also present in a solenoid. In the following, a single pair of poles will be assumed; however, if the source to be represented requires more than a single pair of poles to adequately describe the field, the well-known principles of superposition can be employed.

Figure 11:
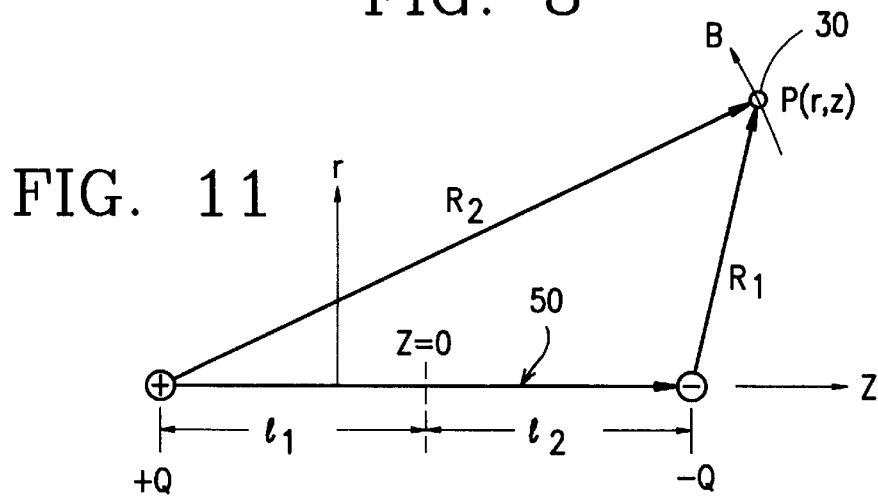
FIG. 11 is a diagrammatic illustration of the spacial relationship of the solenoid and a magnetic field sensor in the MWD system.

In the solenoid illustrated in FIG. 7, the field of each pole of strength Q is given by:

$$\underline{B}=Q*\hat{R}/4\,pi\,R^2 \quad (Eq.6)$$

where $\hat{R}$ is a unit vector pointing away from the pole and R is the magnitude of the distance between the pole and an observation point P, such as a magnetometer (see FIG. 11). Since the vector field $\underline{B}$ at any observation point P is radial from each of the two poles defining the solenoid, the field $\underline{B}$ is coplanar to the plane defined by the solenoid and the observation point so that the present discussion may be restricted to points in that plane, i.e., to the computation of field components in a radial direction r pointing away from the longitudinal z axis of the solenoid. This z axis extends between the pole pair +Q and −Q. For these poles, the magnetic field components Bz in the direction parallel to the axis of the solenoid and Br perpendicular to that axis are given by:

$$BZ = (Q/r^*pi)^*((z-)/R1^3 - (z+l)/R2^3) \quad \text{(Eq.7)}$$

$$Br = (Q^*r/4^*pi)^*(1/R1^3 - 1/R2^3) \quad \text{(Eq.8)}$$

where $$R1 = \text{sqrt}(r^2 + (z-)^2) \quad \text{(Eq.9)}$$

$$R2 = \text{sqrt}(r^2 + (z-)^2) \quad \text{(Eq.10)}$$

Figure 12:
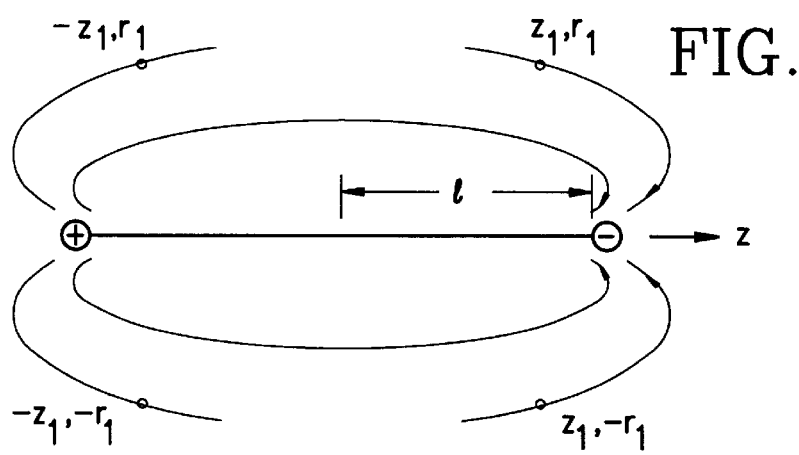
FIG. 12 is a diagrammatic illustration of the magnetic field produced by a solenoid.

The magnetic field lines represented by the equations for Bz and Br have important symmetry properties which can be noted from the diagrammatic representation of the magnetic field lines in FIG. 7 and FIG. 12. Bz and Br each have the same magnitude at all four points z=(±)z1, r=(±)r1. Bz is symmetric about the r axis and antisymmetric about z; i.e., Bz at the point z=z1, r=r1 is the same as Bz at the point z=z1, r=−r1, and has the opposite sign as Bz at the point z=−z1, r=r1. In contrast, the radial component Br is anti-symmetric about both z and r axes; i.e., Br at the point z=z1, r=r1 has the opposite sign as Br at the points z=z1, r=−r1 and at z=−z1, r=r1. Thus Br and Bz have the same sign and magnitude at the points z=z1, r=r1 and z=−z1, r=−r1. The consequence of this is that it is not possible to determine the location of the field source relative to an observation point simply from measurements of the magnetic field alone generated by a solenoid source.

Figure 13:
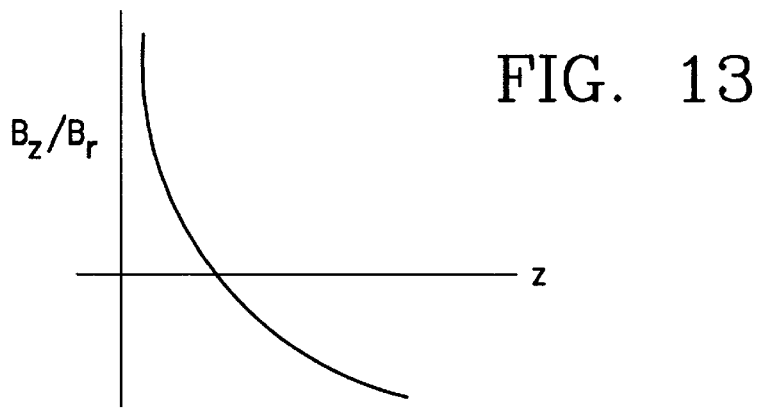
FIG. 13 is a graphical depiction of the variation of the magnetic field strength along the length of the solenoid.

If an additional piece of information is provided; for example, that z is greater than +1, Br will always point away from the z axis. Thus, by noting the direction of Br, it becomes possible to determine the direction to the axis of the magnetic field source. The signed ratio of Bz/Br then uniquely determines z/r, since for a fixed value of r, the behavior of Bz/Br is monotonic and has the form shown in FIG. 13. Thus, measurement of the signed ratio Bz/Br uniquely determines the ratio of z/r. Furthermore, for values of z greater than 1 the value (Bz²+Br²) falls off monotonically with r, and the location of the sensor with respect to the source can be determined.

As previously noted, it is an important aspect of the present invention to handle the foregoing signal processing downhole in the MWD probe. This is done to avoid sending individual magnetic field measurement data to the surface, since MWD probes typically are severely bandwidth limited and are only able to send data by way of pressure pulses at a rate typically of about one bit per second and with a significant and unknown propagation time to the surface. In order to do these calculations downhole, however, the processing must be in precise synchronism with the source power supply on the surface, and thus it is important to determine the unknown time shift ts between the instantaneous value g(ti) uphole which characterizes the source strength, and the instantaneous value of the wave form g(ti) downhole. Since the time shift between the surface and downhole may be unknown or changing, its value is determined and updated by performing a series of calculations utilizing an ensemble of field measurements at times ti with a trial time shift as discussed earlier.

Figure 14:
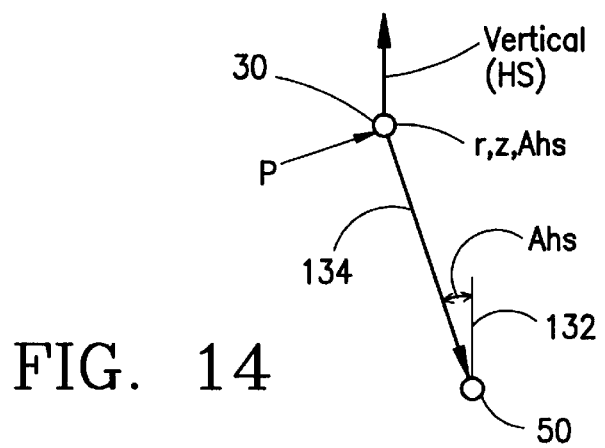
FIG. 14 is a graphical depiction of the vector relationships of the magnetic field produced by the solenoid and the sensor.

The foregoing formulation outlines the manner in which the magnetic field is to be computed at any given observation point. However, a different problem is involved in taking magnetic field measurements and from those measurements determining the relative location of the observation point with respect to the source of the magnetic field. For purposes of this discussion, it is assumed that the relative orientation of the three magnetic field components sensors Bx, By and Bz in the magnetometer 30, which is at the observation point P illustrated in FIG. 11 and in FIG. 14, is known with respect to the direction of the separation vector l which characterizes the direction of the solenoid 50. Accordingly, the xyz coordinate system defined by the magnetometer 30 can be converted to the r, z, Ahs coordinate system of FIGS. 11 and 14. It is noted in this regard that the z direction of the magnetometer, which is conventionally considered to be aligned with the MWD axis, need not be the same z direction as defined by the solenoid axis in FIG. 11. The Ahs parameter (angle high side) is the angle between the plane 132 defined by the direction of gravity through the axis of the solenoid 50, and illustrated in FIG. 14, and the plane 134 defined by the observation point P and the axis of solenoid 50.

The angle high side is readily determined in the manner described in U.S. Pat. No. 5,485,089 and the magnetic field measurement parameters Bx, By and Bz obtained by the magnetometer are then readily transformed into a component in the direction of the solenoid axis z and a component Br/Q which is perpendicular to the axis z and which lies in plane 132. Since the radial portion of the solenoid field lies in the plane 134 defined by the observation point P and the solenoid axis, this part of the field points toward or away from the solenoid axis. Accordingly, the direction of this component defines the value Ahs between the solenoid and the observation point.

The absolute sign of Br, i.e., the direction of Br, may be ambiguous from the data because of the time shift ambiguity of the downhole clock with respect to positive or negative zero crossings of the solenoid source. Nevertheless, since it is assumed beforehand that the observation point P located at z greater than 1 or at z less than −1 and either to the right or to the left of the source (or alternately above or below), the sign of Br is known, and thus Ahs is defined. In practice, to get a good direction determination, it is desirable to deploy the solenoid in an approximate position where there is a large radial field component, if possible. If the magnetometer 30 is located in the plane where z=0, there is no radial field, and the angle Ahs cannot be determined.

After determining the orientation of the rz plane 132 and the quadrant in the rz plane where the observation point is located, the coordinates rz are determined next. When the source is mathematically represented as a magnetic dipole of strength m, the relationship between r and z is described in U.S. Pat. No. 5,485,089, and the measured magnetic field components to source strength ratios are given by Br/m and Bz/m. If the source is to be represented by the much more accurate characterization of two time/varying poles +Q and −Q, separated by the vector 2 l, the explicit relationship described in the '708 patent is not available. To find r and z in this circumstance from measured values brm=Br/S and bzm=Bz/S an iterative process is used.

The iterative process starts with finding a first approximation to r and z by approximating the source as a dipole, as disclosed in U.S. Pat. No. 5,485,089. That is, the source is approximated with a dipole moment given by m=Q2 l, the vector direction of m being the same as that of l. These first approximations for r and z are designated r0 and z0, with the ratio z0/r0 being given by Equation 9 in the '089 patent with Sr and Sz in that equation being replaced by brm and bzm; i.e.:

$$(z0/r0) = (3*bzm/4*brm)*\text{sqrt}(1+(8/9)*(brm/bzm)^2) \quad \text{(Eq.11)}$$

Then a beginning value for r0 for the iteration procedure can be found from Equation 12 of the '089 patent. Using the foregoing ratio of (z0/r0), the value for r0 may thus be expressed:

$$r0 = (3/4 pi)*(z0/r0)/(1+(z0/r0)^2)^{5/2})^{1/3} \quad \text{(Eq.12)}$$

z0 is then found from the known ratio (z0/r0) found in equation 8. It is convenient to write r0 and z0 as a two row, one column matrix, i.e., $$rz0 = \begin{vmatrix} r0 \\ z0 \end{vmatrix} \quad \text{(Eq. 13)}$$

Figure 15:
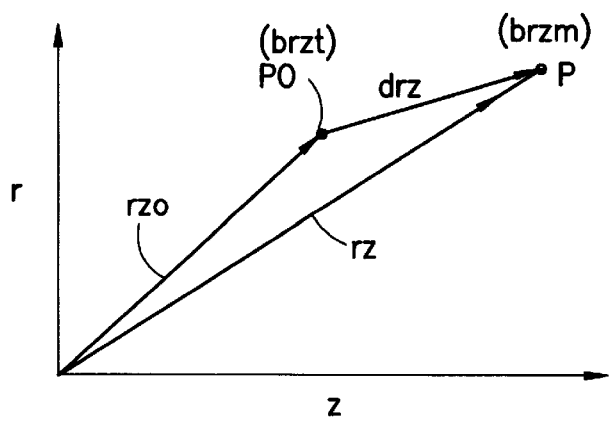
FIG. 15 is a graphical depiction of the spatial relationship of the points P0 and P and the field values.

These values of r0, z0 are a first guess in an iterative procedure to find the correct value of r and z to match the measured values brm and bzm as indicated in FIG. 15 which schematically represents the rz plane. At the point P0 shown, the theoretical values for br and bz; i.e., brt and bzt, are computed using equations 7 and 8 and rz0, to define a matrix:

$$brzt = \begin{vmatrix} brt \\ bzt \end{vmatrix} \quad \text{(Eq. 14)}$$

The measured values brm and bzm also define a matrix:

$$brzm = \begin{vmatrix} brm \\ bzm \end{vmatrix} \quad \text{(Eq. 15)}$$

These measured values define the point Prz from the origin where the theoretical and measured values should match, as indicated in FIG. 15. As indicated, the difference vector from rz0 to rz is:

$$drz = rz - rz0 \quad \text{(Eq.16)}$$

The difference between the brzt at P0 and brzm can be written dbrz=brzm−brzt. The theoretical values of br and bz in the vicinity of P0 are readily expanded in a Taylor series and written in matrix form as:

$$brzm = brzt + dbrzdrz*drz; \quad \text{(Eq.17)}$$

i.e.

$$dbrz = dbrzm - dbrzt = dbrzdrz*drz, \quad \text{(Eq.18)}$$

where dbrzdrz is a Jacobian matrix of partial derivatives, i.e,:

$$dbrzdrz = \begin{vmatrix} dbr/dr & dbr/dz \\ dbz/dr & dbz/dz \end{vmatrix} \quad \text{(Eq. 19)}$$

Equation (18) is readily solved for drz using the left inverse of dbrzdrz as:

$$drz = dbrzdrz \backslash dbrz, \quad \text{(Eq.20)}$$

and a new approximation for rz where brm and bzm will match approximately the theoretical value of equation (14); i.e.:

$$rz = rz0 + drz \quad \text{(Eq.21)}$$

By using this value for rz in place of rz0 in equation (14) this procedure can be used over and over to get better and better fits to the correct value of rz to match the data. In practice the method converges very quickly.

Thus, a procedure is disclosed whereby magnetic field measurements from an observation point in the near field of a solenoid whose strength varies slowly enough in time that static magnetic field theory is relevant can be used to precisely determine the location of the observation point relative to the solenoid.

Although the invention has been described in terms of a specific embodiment it will be understood that variations and modifications may be made without departing from the true spirit and scope thereof, as set forth in the accompanying claims.

What is claimed is:

1. A method for electromagnetic proximity determination, comprising:
   supplying a time-varying current having a repetitive waveform with periods of positive and negative current to a ferromagnetic solenoid source deployed in a borehole, said current at said solenoid source generating a non-sinusoidal, time-varying magnetic field with a known solenoid source strength parameter;
   detecting three vector components of the time-varying magnetic field at a sensor in a second, nearby borehole;
   obtaining from each of said three vector components an ensemble of individual magnetic field measurement values;
   determining times of polarity reversal of the field components;
   processing the ensemble of magnetic field measurement values for each of said three vector components with respect to the times of field polarity reversal over at least one of said periods of positive and negative current in said solenoid source to obtain field strength parameters; and
   using said field strength parameters and the said solenoid source strength parameter to determine the distance between said solenoid source and said sensor.

2. The method of claim 1, wherein the step of processing said ensemble measurement values provides time synchronization between the field measurement values and said time varying current.

3. The method of claim 2 wherein said time varying current waveform is asymmetrical to permit determination of polarity synchronization between the magnetic field measurement values and the said solenoid source.

4. The method of claim 2 further including providing a time synchronized weighing factor to determine said field strength parameters.

5. The method of claim 1 wherein said processing effectively eliminates measurement values near times of polarity reversal of the field components.

6. The method of claim 1, wherein measurement processing is done in a borehole.

7. The method of claim 6, further including transmitting processed signals from the borehole to a surface location.

8. The method of claim 1, further including:
   determining the orientation of said solenoid source;
   determining the radial component of the magnetic field of said solenoid source; and
   determining the direction to said solenoid using said determinations of said radial field components and solenoid source orientation.

9. The method of claim 1 further including determining field measurement parameters utilizing a time synchronized weighing factor.

10. The method of claim 8, further including eliminating measurement data taken near times of polarity reversal of the source to provide said field strength parameters.

11. A method of near-field proximity determination for guidance of a borehole drill, comprising:
   energizing a target solenoid in a target borehole with a time-varying current having a repetitive waveform to produce a corresponding time-varying magnetic field;
   obtaining an ensemble of measurements of said magnetic field in a second, nearby borehole;
   adjusting said measurements by excluding measurements taken during transition periods of said time-varying current and said time-varying magnetic field;
   synchronizing the measured magnetic field with said time-varying current waveform; and
   determining from the synchronized measured field the distance from said borehole to said solenoid.

12. The method of claim 11, further including determining the direction from said borehole to said solenoid.

13. The method of claim 11, further including obtaining an ensemble of current waveform, measurements by measuring said time-varying current and periodically sampling the measured current.

14. The method of claim 13, wherein obtaining an ensemble of measurements of said magnetic field includes measuring said field and periodically sampling the field measurements.

15. The method of claim 14, wherein synchronizing the measured field with the measured current waveform includes producing a time shift of said field measurements to maximize the value of the sum of the ensemble of measurements.

16. The method of claim 12, further including locating the target solenoid in a target borehole at a distance from said second borehole approximately equal to the length of said solenoid.

17. The method of claim 16, further including guiding drilling of said second borehole with respect to said target borehole in accordance with said determined distance and direction.

18. The method of claim 11, wherein energizing said target solenoid includes driving said solenoid with a time-varying current having a nonsinusoidal waveform to produce two spaced, temporally varying magnetic poles.

19. The method of claim 18, wherein energizing said target solenoid includes driving and solenoid with an alternating current to drive said solenoid to saturation first in one direction and then in the opposite direction during each alternating current cycle.

20. The method of claim 19, wherein energizing said target solenoid includes driving said solenoid at a frequency sufficiently low that said corresponding magnetic field is produced in synchronism with said drive current.

21. The method of claim 19, wherein energizing said target solenoid includes driving said solenoid to produce a corresponding magnetic field which varies in synchronization with said current source but which is not proportional to said current.

* * * * *